B. H. NELSON.
TRAVELING SHOCK GATHERER.
APPLICATION FILED JAN. 8, 1915.
1,216,350.
Patented Feb. 20, 1917.
2 SHEETS—SHEET 1.
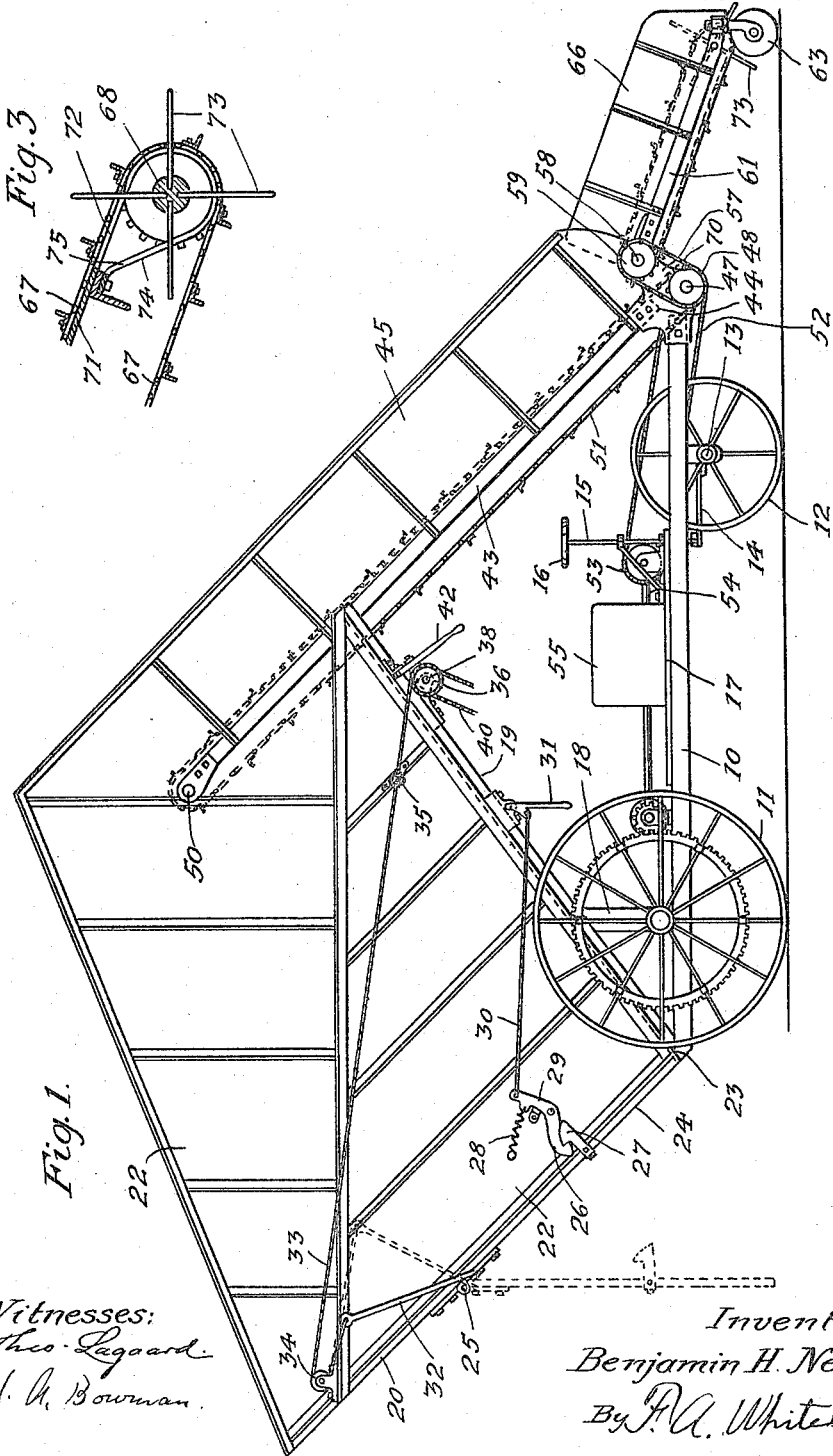
Witnesses:
Theo. Lagaard.
H. A. Bowman.
Inventor
Benjamin H. Nelson.
By P. A. Whiteley
his Attorney.

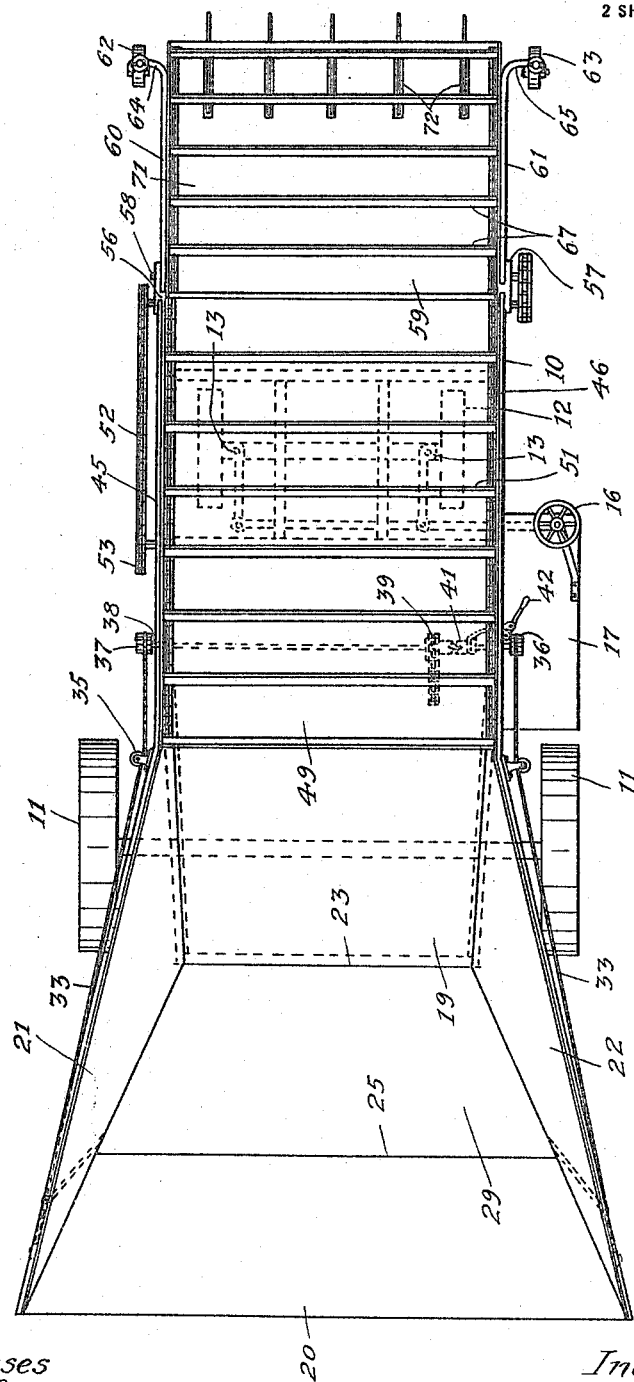

UNITED STATES PATENT OFFICE.

BENJAMIN H. NELSON, OF ST. THOMAS, MINNESOTA.

TRAVELING SHOCK-GATHERER.

1,216,350.  Specification of Letters Patent.  Patented Feb. 20, 1917.

Application filed January 8, 1915. Serial No. 1,088.

*To all whom it may concern:*

Be it known that I, BENJAMIN H. NELSON, a citizen of the United States, residing at St. Thomas, in the county of Pembina and State of Minnesota, have invented certain new and useful Improvements in Traveling Shock-Gatherers, of which the following is a specification.

My invention relates to traveling shock gatherers and has for its object to provide a self-propelled vehicle comprising shock lifting and elevating means and means for holding an accumulation of such shocks and for discharging such accumulation subject to the will of the operator, the vehicle and the shock elevating means being simultaneously driven by a motor mounted on the frame and being provided with a common support upon said frame.

The full objects and advantages of my invention will appear in connection with the detailed description thereof and are particularly pointed out in the claims.

In the drawings, illustrating the application of my invention in one form,—

Figure 1 is a side elevation of a machine embodying my invention. Fig. 2 is a plan view of the same. Fig. 3 is a detail view of the shock elevating mechanism.

As illustrated and described, my invention comprises a substantially rectangular frame 10 mounted upon rear traction wheels 11 and front steering wheels 12, said steering wheels being inside of frame 10 and secured upon steering knuckles 13. The steering knuckles are provided with arms 14 connected by a bar and controlled by chains running to a steering post 15 having a hand wheel 16 located at the front end of an operator's platform 17 at one side of the machine. Secured to the frame 10 directly at the rear part thereof and by means of standards 18 is a shock container or tank comprising a sloping front wall 19, a rearwardly sloping wall 20 and outwardly sloping side walls 21 and 22. The walls of the container are preferably formed of sheet metal reinforced by ribs of angle iron, as shown in Fig. 1. It will be apparent that shocks or other material thrown into this tank will tend to gravitate to point 23 which forms an angular junction of the front and rear walls 19 and 20. A considerable portion of the rear wall 20 is provided with a swinging gate 24 which is hinged at 25 and is held in a closed position by means of swinging catches 26 engaging hooks 27 on the gate 24. The catch 26 is held in engaging position by means of a spring 28 connected with an arm 29 which, through a cord 30, may be operated by a hand lever 31 adjacent to the operator's platform 17. Rigidly connected with gate 24 are a pair of arms 32. Connected with the ends of the arms 32 at each side of the machine are cords 33 which extend over sheave wheels 34 and 35 and run to drums 36 and 37 on a shaft 38 journaled to the under side of wall 19. The shaft 38 has loose thereon a pulley 39 driven by a belt 40. By means of a clutch 41 and a hand lever 42 adjacent the platform 17 the operator may connect the shaft 38 with the pulley 36 by which means the gate 24 will be swung into closing position. The upper end of the sloping front wall 19 is connected with a carrier frame 43 which is rigidly secured at its lower end at 44 to the main frame 10. The carrier frame has connected therewith side walls 45 and 46 which are co-extensive at their upper portions with the wings 21 and 22. It will be seen therefore that the carrier frame taken with its side walls 45 and the container comprises in effect an integral structure having supports at the front and rear portions of the frame 10. The weight of these parts is fairly well distributed over the whole frame, but the weight of the load of shocks when the same has been deposited within the container will be mainly carried upon the rear traction wheels 11.

Journaled at the lower front end of carrier frame 43 is a shaft 47 having thereon a roller 48. Another roller 49 is journaled upon the shaft 50 at the upper end of the carrier frame, which, as clearly shown in Fig. 1, projects a considerable distance above and to the rear of the upper edge of the front wall 19. An endless carrier 51 runs over the rollers 48 and 50, being driven by a sprocket chain 52 extending from a sprocket wheel 53 geared to the crank shaft 54 of a motor engine, indicated diagrammatically at 55. Upon the front ends of the carrier frame 43 are rigidly secured a pair of arms 56 and 57, and in these arms is journaled a shaft 58 having thereon a roller 59. A supplemental pick-up frame comprising connected side sections 60 and 61 is also journaled upon shaft 58 and is free to oscillate upon the same. The forward end of said supplemental frame is supported by caster wheels 62 and 63 having their spindles journaled in arms 64 and 65 offset from frame members 60 and 61. The supplemental frame is provided with side walls 66, and has an endless carrier 67 operated over roller 59 and a roller 68 journaled in the front of the supplemental frame, roller 59 being driven by a sprocket chain 70 from the shaft 47. As shown in Figs. 2 and 3, the floor 71 of the supplementary carrier frame is slotted at 72 to permit the passage of pick-up arms 73 integrally connected with roller 68. The bow-shaped extension 74 of the floor is also provided with slots 75 for the passage of the arms 73.

In operation the machine is driven over the ground by the engine 55 in which manner the pick-up frame is brought into successive engagement with the shocks, this frame oscillating freely along the ground by reason of the pivotal connection with shaft 58 and the support through caster wheel 63. At the same time that the machine is being forwarded the pick-up carrier 67 and arms 73 oscillated therewith and the elevating carrier 51 are being operated. The shocks of grain will be first lifted upon the flexible pick-up carrier from which they will drop to the elevating carrier moving in the same direction and will be carried to the end of said elevating carrier and dropped directly into the container or tank. Being thrown from the end of the pick-up carrier at 50, there will be a tendency for the bundles from the shocks to move toward the rear of the container. This, in view of the sloping walls of the container or tank, will enable the same to be loaded without any assistance on the part of the operator. When the container has been filled to its capacity, the operator will drive the load to a point of discharge and by means of the hand lever 31 will release gate 24 which will permit the entire load in the tank to discharge by gravity as the machine is driven in a forward direction from the point of discharge. The operator can then, through handle 42, effect closure of gate 24 and continue the operation until another tank of shocks has been gathered.

It will be apparent that I have developed an exceedingly simple and efficient apparatus for the purpose. The shocks are directly elevated without change of direction of movement from the point of pick-up to the point of discharge into the tank which is so constructed that the load forms itself therein without the intervention of any operator. The framework of the elevator mechanism and of the tank is so inter-related as to involve a highly efficient and strong organization for the support of the elevator and at the same time one in which a minimum amount of material and weight is necessary. The driving means from the motor to the shock lifting and elevating carriers is direct and short and the arrangement of carrier frame and tank is such as to provide ample space beneath the carrier and the forwardly sloping tank wall for motor, steering walls, transmission, etc. My machine is not merely a shock lifting device; that is, a device for picking up shocks and elevating them to a point where they may be discharged into a wagon-box or rack and there loaded and cared for by an operator; but my machine is a shock loader in the real sense of the term in that from the time the shock lifter engages the shock and starts it on its way up the elevating carrier the machine takes care of the entire disposition of the shocks until a load is accumulated and ready for discharge. Even then the machine discharges itself because the operator merely has to release the gate by pulling upon a lever. It is entirely practicable for one man to operate this machine and gather all the shocks of a field either for stacking or threshing.

I claim:

1. A shock loader having a substantially horizontal main frame, traction wheels near the rear and steering wheels near the front of said frame, a container having side walls and diverging, upwardly-extending front and rear walls, the apex of said container being adjacent the axis of the traction wheels, a door in the rear wall of said container, a conveyer extending from the upper, forward portion of the container to the front portion of the main frame, pick-up means to deposit shocks on said conveyer, and power means on the main frame underneath said container and conveyer to propel the machine and drive the conveyer and pick-up means.

2. A shock loader having a substantially horizontal main frame, traction wheels near the rear and steering wheels near the front of said frame, a container having diverging, upwardly-extending front and rear walls and diverging, upwardly-extending side walls, the apex of said container being adjacent the axis of the traction wheels, a door in the rear wall of said container, a conveyer extending from the upper, forward portion of the container to the front portion of the main frame, the discharge point of said conveyer being some distance back of the front edge of said container, pick-up means to deposit shocks on said conveyer, and power means on the main frame underneath said container and conveyer to propel the machine and drive the conveyer and pick-up means.

3. A shock loader having a substantially horizontal main frame, traction wheels near the rear and steering wheels near the front of said frame, a container having side walls and diverging, upwardly-extending front and rear walls, the apex of said container being adjacent the axis of the traction wheels, a door hinged at its upper edge in the rear wall of said container, a conveyer extending from the upper, forward portion of the container to the front portion of the main frame, forwardly-extending pick-up means to deposit shocks on said conveyer, and power means on the main frame underneath said container and conveyer to propel the machine and drive the conveyer and pick-up means, an operator's platform at one side of the main frame and controlling means adjacent thereto for the various instrumentalities.

In testimony whereof I affix my signature in presence of two witnesses.

BENJAMIN H. NELSON.

Witnesses:
 A. L. MILLER,
 ROBERT MILLER.

Copies of this patent may be obtained for five cents each, by addressing the "Commissioner of Patents, Washington, D. C."

Correction in Letters Patent No. 1,216,350

It is hereby certified that in Letters Patent No. 1,216,350, granted February 20, 1917, upon the application of Benjamin H. Nelson, for an improvement in "Traveling Shock-Gatherers," an error appears requiring correction as follows: In the grant and in the printed specification the residence of the patentee was erroneously written and printed "St. Thomas, Minnesota," whereas said residence should have been written and printed *St. Thomas, North Dakota;* and that the said Letters Patent should be read with this correction therein that the same may conform to the record of the case in the Patent Office.

Signed and sealed this 19th day of June, A. D., 1917.

[SEAL.]

F. W. H. CLAY,
*Acting Commissioner of Patents.*